Oct. 8, 1929.  C. B. McCATHRON  1,730,517
VEGETABLE PEELING MACHINE
Filed Jan. 26, 1927  7 Sheets-Sheet 1

Inventor
C. B. McCathron
A. S. Pattison
By
Attorneys

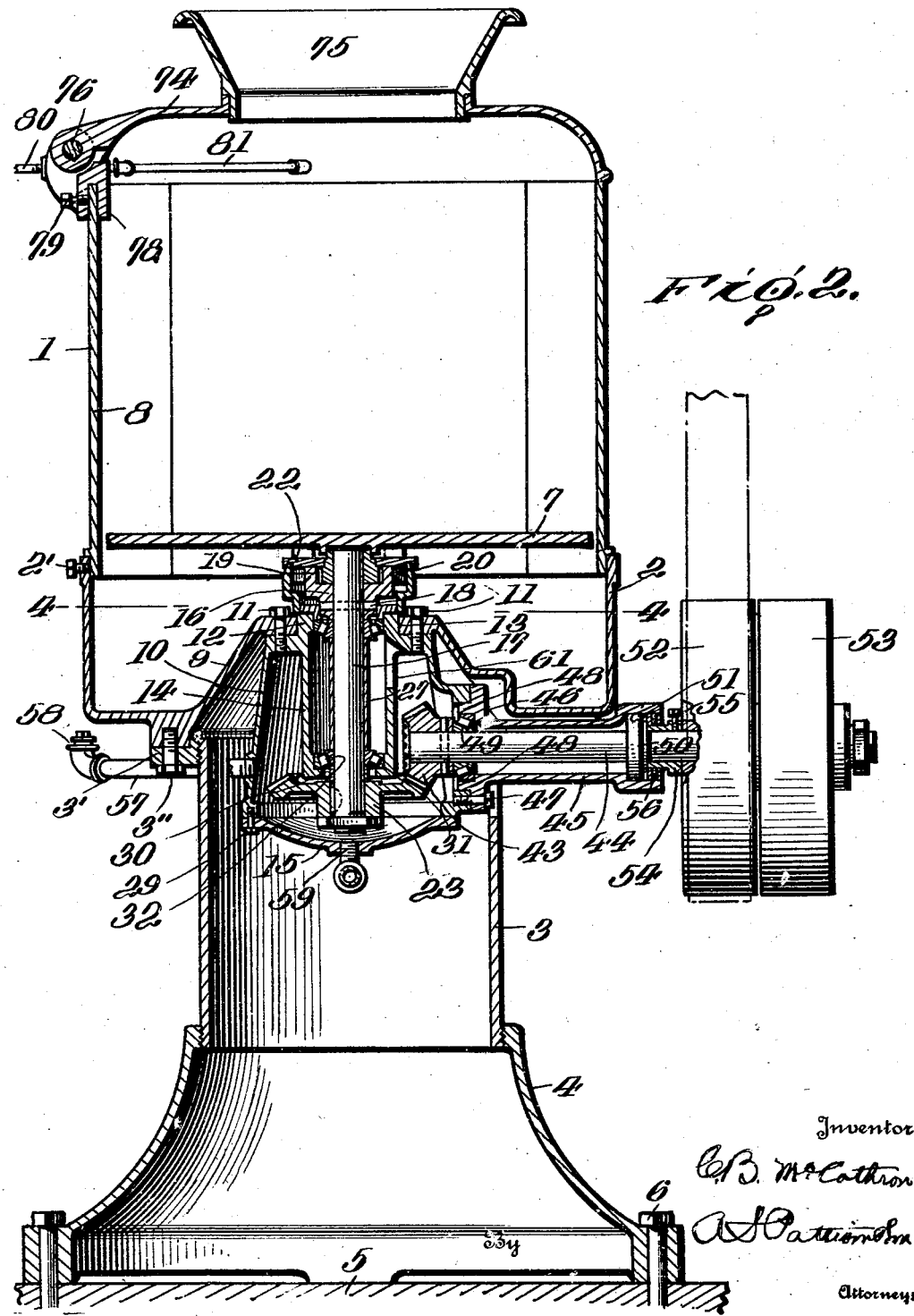

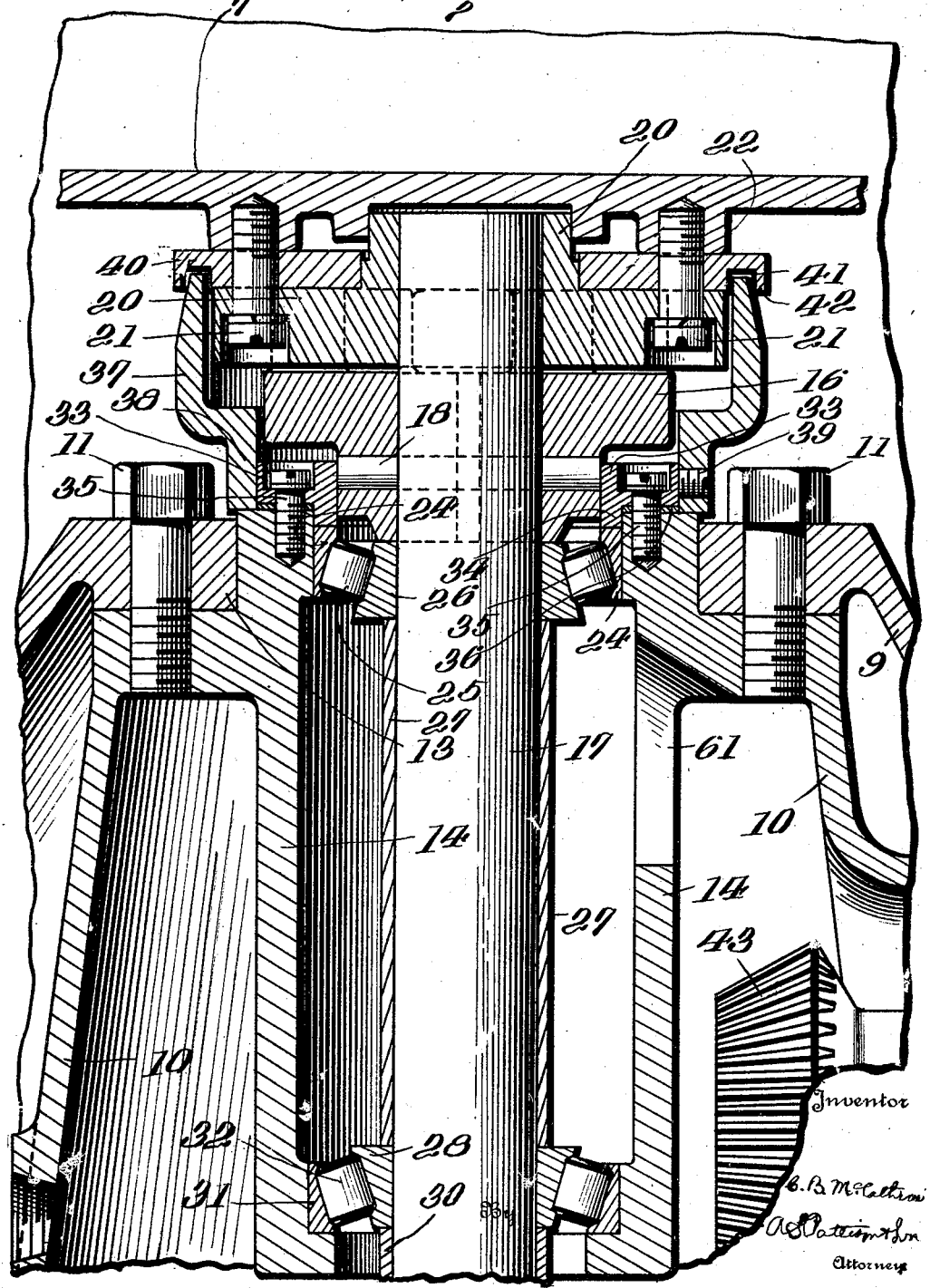

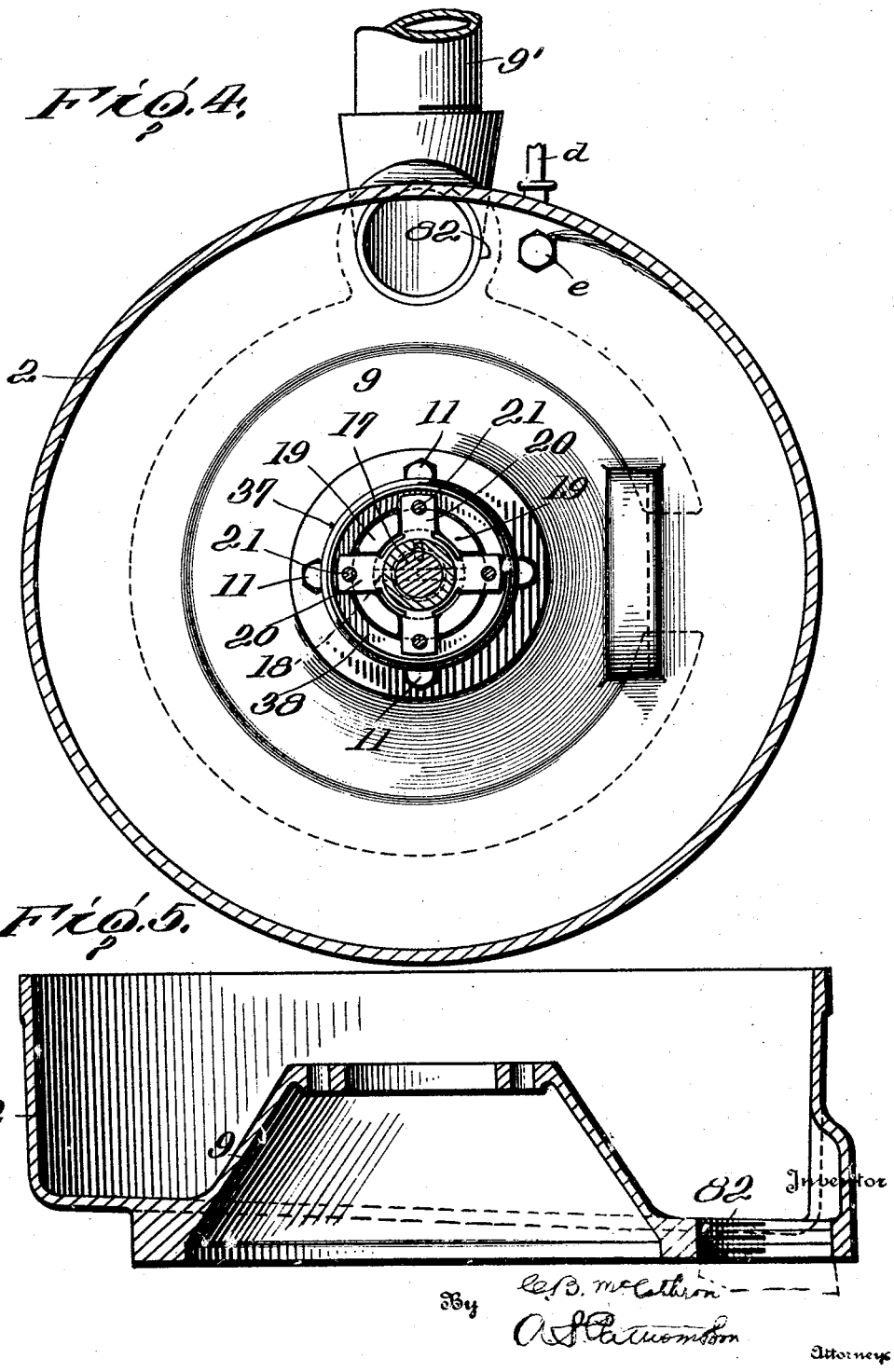

Oct. 8, 1929.  C. B. McCATHRON  1,730,517
VEGETABLE PEELING MACHINE
Filed Jan. 26, 1927   7 Sheets-Sheet 5
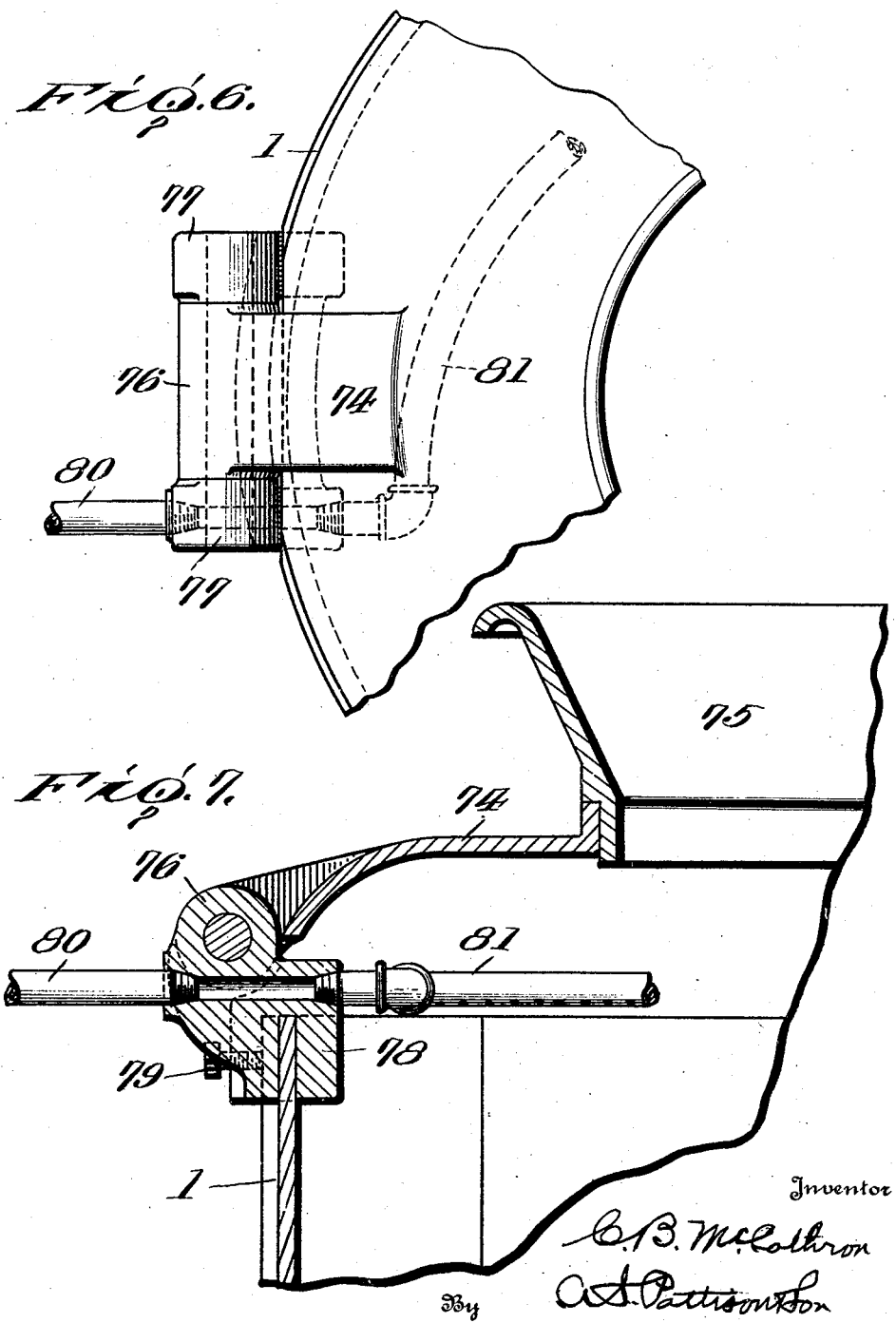

Oct. 8, 1929. C. B. McCATHRON 1,730,517
VEGETABLE PEELING MACHINE
Filed Jan. 26, 1927 7 Sheets-Sheet 6
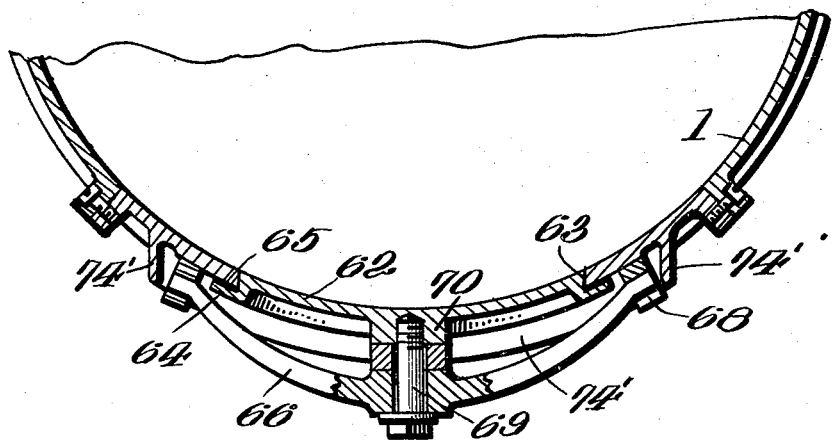
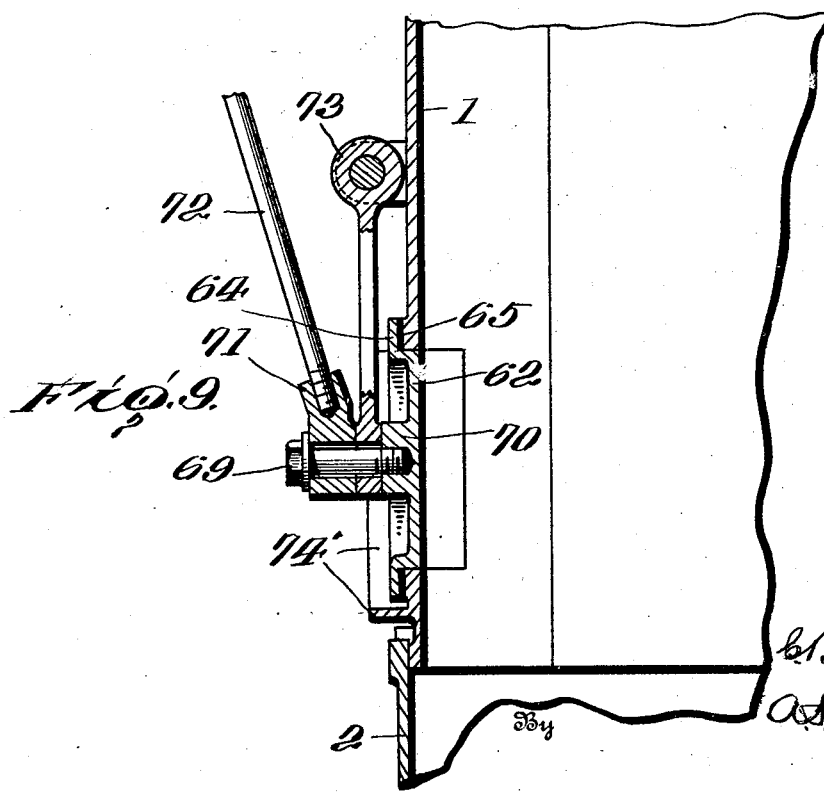

Oct. 8, 1929.  C. B. McCATHRON  1,730,517
VEGETABLE PEELING MACHINE
Filed Jan. 26, 1927    7 Sheets-Sheet 7
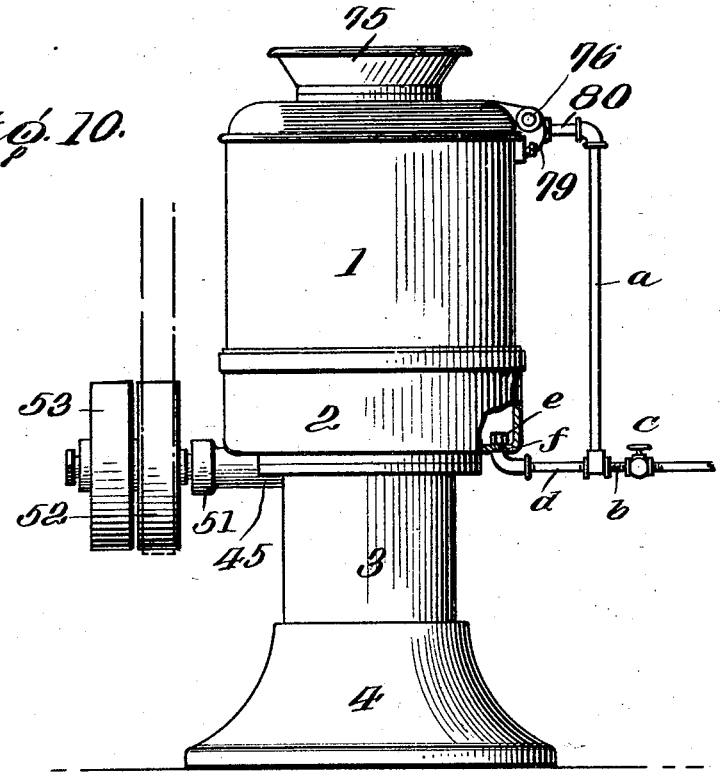
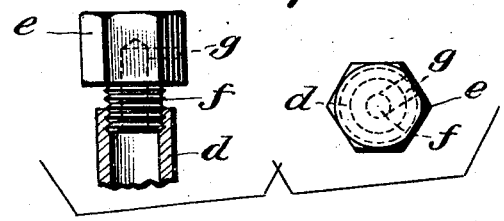
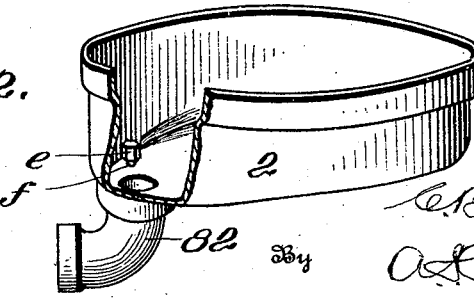

Patented Oct. 8, 1929

1,730,517

UNITED STATES PATENT OFFICE

CLAUDE B. McCATHRON, OF ROCHESTER, NEW YORK, ASSIGNOR TO JOSIAH ANSTICE & CO., INC., OF ROCHESTER, NEW YORK

VEGETABLE-PEELING MACHINE

Application filed January 26, 1927. Serial No. 163,763.

This invention relates to improvements in vegetable peeling machines and the machines on which the improvements are made consist essentially of a container provided with an interior granular coating having a revolvable bottom which is also coated with granular material on which the vegetables rest and are revolved, causing them by contact with the revolving bottom and with the inner surface of the container to be peeled.

In machines of the above type there is a vertically arranged shaft on which the revolving bottom is supported, and due to the shifting of the weight of the vegetables, the vertical shaft bearings are worn unevenly because of the shifting weight.

One of the present improvements is to support the revolving disk on certain forms of bearing which will not become worn unevenly by use.

Another difficulty with machines of the above type is to keep the moving parts properly oiled, because ordinarily hand oiling is the method employed.

Another improvement pertains to providing a metal reservoir at the bottom of the peeler in which the moving parts are submerged in oil, and in which the oil is splashed and the other parts lubricated. This provides for constant oiling so that the machine will be long lived in use, and enables the machine to be used for months with practically no attention.

In machines of this type water is fed to the container for washing out the peelings of the vegetables, and it becomes necessary to protect the mechanism below the revolving disk from the water which flows past the revolving disk from striking the moving parts of the mechanism. I provide an improved structure which is adapted to prevent the water from flowing to the moving mechanism.

Other improvements will appear from the following description.

Figure 2 is a vertical central sectional view of the improved machine.

Figure 3 is an enlarged vertical central sectional view taken through the supporting shaft and its immediately associated parts.

Figure 4 is a relatively enlarged sectional view on line 4—4 of Figure 2, looking upward.

Figure 5 is a relatively enlarged vertical central sectional view of the base for the container.

Figure 6 is an enlarged top plan view of a part of the container showing the hinge lug and the water connection.

Figure 7 is a similar enlarged vertical sectional view of Figure 6.

Figure 8 is a relatively enlarged horizontal sectional view on the line 8—8 of Figure 1, through the removable door and its operating mechanism.

Figure 9 is a vertical sectional view taken centrally through Figure 8.

Figure 10 is a side elevation of the improved peeler looking at it from the reverse side shown in Figure 1.

Figure 11 is a side view and a top view of the water feeding device for the base 2.

Figure 12 is a perspective view partly in section, of the base 2.

Figure 1:
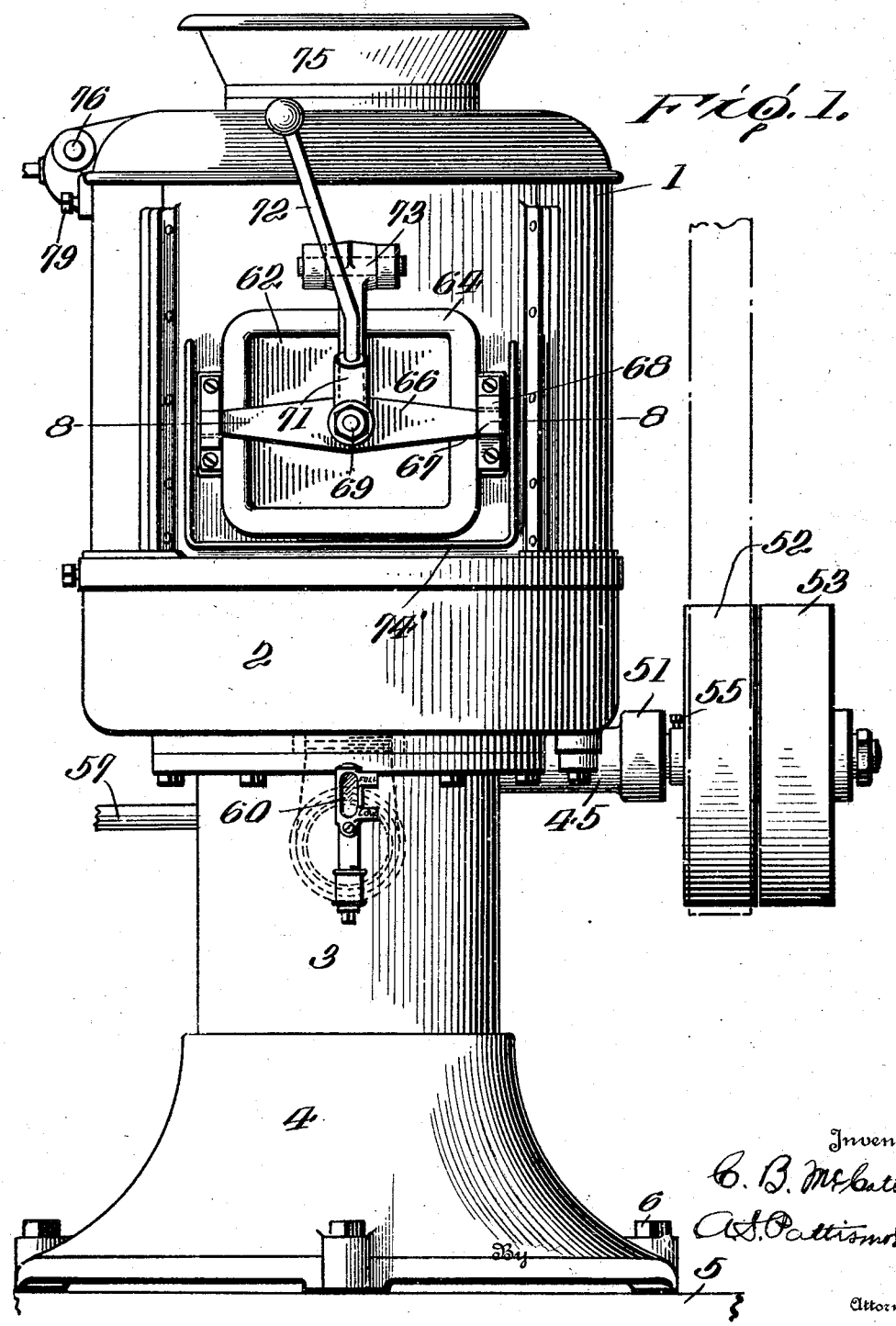
Figure 1 is a side elevation of my improved peeling machine.

In carrying out my improvements I utilize preferably a vertical cylindrical container 1 that has its lower edge seated upon the upper edge of a base 2, the adjacent edges preferably telescoping. Suitably attached to the under side of the base 2 is a supporting column 3 that has its lower end screwed or otherwise connected with the upper end of a suitable support or pedestal 4 that is fastened to the floor or other support 5 by means of bolts 6. The upper end of said column is screwed into a column top in the form of an outwardly extending flange 3' through which flange bolts 3" pass into the bottom of said base 2.

Located within the cylindrical container 1 is a rotatable disk 7. This rotatable disk has its upper surface provided with carborundum or other material (not shown) and the interior 8 of the container is likewise coated with carborundum or other suitable material (not shown).

The base 2 has an upwardly extending central portion 9, and depending from the apex of this upwardly extending central portion 9 is a suitable gear casing 10. This gear case is secured to the upwardly extending central portion 9 by means of suitable bolts 11. The gear case 10 preferably has its upper portion 12 formed to fit in a central opening 13 formed in the upwardly extending portion 9 of the base 2. It will be observed that a vertically depending hollow portion 14 is preferably made integral with the gear housing, the said portion 14 extending downwardly a suitable distance, and stopping a suitable distance above the bottom 15 of said gear case.

A clutch driver 16 is connected with the upper end of the shaft 17 by means of a pin 18 passing through the lower portion of the clutch driver and through the said shaft. This clutch driver has an upwardly extending part 19 that strikes a clutch driven member 20 that is secured to the under side of the disk 7, by means of screws 21, the under side of the disk 7 being provided with projections 22 into which the said screws or bolts pass. It will be understood that the clutch driven member 20 fits loosely on the upper end of the shaft. This arrangement enables the disk to be removed without disturbing said shaft 17.

The said shaft 17 passes centrally through the depending portion 14 and its lower end extends beyond the said portion whereby it receives a gear wheel 23 that is suitably attached thereto against rotation. Located in the upper portion 12 of the interior housing 14 is the outer member 24 of a roller or ball bearing 25, and on the shaft 17 is a coacting roller bearing member 26, the said rollers or balls being between the parts 24 and 26. Located around the said shaft 17 is a sleeve 27 that extends downward and has its lower end in engagement with an inner member 28 of a ball or roller bearing. An outer roller or ball bearing member 31 is positioned in the lower end of said inner housing 14 and between the parts 28 and 31 are rollers or balls 32.

From the foregoing description it will be observed that the sleeve 27 regulates the distance between the inner roller bearing member 26 located at the upper portion of the shaft 17 and the inner member 28 located around the lower portion of the said shaft. In this connection attention is directed to a collar 33 that is fastened to the upper end of the inner housing 14, said collar having a depending portion 34 that engages the outer member 24 of the upper bearing. This member 33 is connected with the upper end of the housing 14 by means of suitable screws 35 so that when said collar is screwed down into position, it regulates the location of the outer member 24 of said roller bearing. Attention is also directed to shims 36 located between the collar and the upper end of the housing 14, the said shims serving to regulate how far the member 24 of the roller bearing shall be pushed downwardly. Attention is also directed to the fact that in fitting the parts together the short sleeve 30 located between the hub of the gear wheel 23 and the lower member 31 of the roller bearing at the lower portion of the shaft, can have a part of it suitably removed as by filling or otherwise, to locate and to fit the gear in proper mesh with the pinion 43.

From the foregoing description it will be observed that the collar 30 controls the position of the gear 23, while the sleeve 27 controls the position of the inner member of the upper bearing.

Attention is directed to a water shed 37 that is located to entirely surround the upper portion of the mechanism located at the upper end of the inner housing 14. This water shed has its lower end 38 extending inward and therefore smaller than its upper end, the said lower end fitting tightly the outer vertical surface of the collar 33, and is united to the collar by a set screw 39. A cover 40 for this water shed is secured on top of the driven clutch member 20 and has at its under side an upwardly extending inverted U-shaped groove 41 that receives the upper extremity 42 of the water shed 37. In this manner all of the working parts between the rotating disk and the upper end of the gear housing is protected from the entrance of water, which I find to be quite desirable.

For the purpose of driving the gear 23 and through it the shaft 17 and the disk 7, a vertically arranged pinion 43 is located within the lower portion of the gear housing, and on the inner end of a horizontal shaft 44. This shaft 44 passes through an outwardly extending horizontal housing 45 that has its inner end provided with a flange 46 fitting against the outer side of the gear case and united to the gear case by suitable bolts 47. Projecting outwardly from the said flange 46 is a suitable flange 48 fitting in an opening formed in the wall of the gear housing. This shaft 44 is supported upon roller bearings 49 located in the inner end of the housing 45 and around the shaft 44, while its outer end is provided with a similar roller or ball bearing 50 that is located within an enlarged outer end 51 of the housing 45.

Attached to the outer end of the shaft 44 are fast and loose pulleys 52 and 53 which are suitably located thereon. A sleeve 54 is located between the hub of the inner pulley and the inner portion of the roller or ball bearing 50 and this sleeve is attached to the shaft by a suitable set screw 55. In this way either or both of the pulleys may be removed without disturbing the adjustment of the roller bearings for the shaft 44.

Placed around the sleeve 54 and at the outer end of the roller or ball bearing 50 are felt washers 56 for the purpose of preventing the flow of oil through the said bearing.

Oil is maintained at a proper height in the gear housing to oil the said gears and the said shaft. Oil is supplied through a pipe 57 having at its outer end a plug 58, and the oil flows through a pipe 59 located at the lowest portion of the bottom 15, the said pipe extending laterally outward and ends in an oil gauge 60 that indicates the height of the oil in the said gear case.

In this manner oil is maintained in the gear case which insures proper oiling of all of the moving parts, part of the oil being splashed through the opening 61 in the inner housing 14 whence it will reach the roller bearing at the upper portion of the revolving shaft, any surplus oil then dropping and passing through the lower roller bearing upon the gear wheel 23. The level of the oil will submerge the gear wheel 23 and the lower portion of the pinion 43. In this manner ample lubrication is attained.

The container 1 is provided with a suitable door 62 that fits in an opening 63 formed in the said container. For the purpose of making this door water tight, it is provided with a flange 64 and a suitable rubber contact 65 placed between the flange and the container. The fastening means for this door consists of a member 66 that is long enough to extend across the door 62 and to have its ends 67 enter catches 68 that are secured to the outer face of the container 1. Said member 66 is centrally pivoted on a bolt 69 that passes into a projection 70 formed on the door 62. An upwardly extending projection 71 from the center of the member 66 carries a suitable handle 72 by which the part 66 is tilted. When the parts are in the position shown in Figures 1, 8 and 9, the door is fastened but when swung to the right, then the ends 67 are thrown out of engagement with the catches 68 and the door can be opened and swung outwardly and upwardly on a suitable hinge 73.

The object of this door is for the purpose of emptying the vegetables from the container after they have been peeled. For the purpose of assisting in this emptying of the container, I provide a suitable U-shaped trough 74' that extends around the lower portion of the door to guide the escaping vegetables to any desired point to enter a receptacle placed for the purpose of receiving them.

By reference to Figures 2 and 7, it will be noted that 74 is a cover for the container. This cover has centrally arranged a suitable hopper 75 and carries at one part a hinge member 76 that enters between projections 77 that are carried by a suitable member 78 that fits on the upper edge of the container 1 and is held thereto by suitable set screws 79. Passing through one of the projections 77 is a suitable pipe 80 that extends into the container and has its inner end united to a water pipe 81 that is arranged in a circular relation so as to feed the water to the vegetables while they are being peeled. The refuse from the peeled vegetables flows down into the base 2 and from the base through a waste passageway 82 (Figure 5) and is conveyed to any desired place.

In the accompanying drawings I have shown a conventional disk 7. Since the construction and formation of the disk forms no part of the present invention, it is only necessary to show a flat conventional disk. Of course any form of disk desired can be used instead of the flat disk 7.

While I prefer to have the base projecting upward as shown, I desire it understood that it may be made flat without departing from the broad invention disclosed.

The water fed to the container through the pipe 80 first passes upward through a connection $a$, the lower end thereof being connected with a horizontal pipe $b$, the water being controlled by a suitable valve $c$. In addition to the feed of the water to the upper portion of the container 1, I feed water at the same time to the lower part through a pipe connection $d$. The upper part of this connection $d$ is connected with a plug $e$ that passes through the bottom of the base 2. This plug is provided with a vertical passageway $f$ terminating in a lateral passageway $g$ that extends preferably away from the waste passage 82. The object of this additional water feeding device is to feed water at the base of the vegetables that are being peeled. It will be realized that the water from above washes the peelings, etc., to the bottom of the mass which then flows into the base 2. By feeding water through the plug $e$ this base 2 is being flushed to cause the waste product to readily flow out of the waste pipe 82.

I wish it understood that changes can be made in the construction of the improvements herein described without departing from the spirit and scope of my invention so long as the said changes are within a fair interpretation of the appended claims.

Having thus described my invention, what I desire to claim and secure by Letters Patent is:

1. A vegetable peeling machine comprising a container, a revolving disk acting as a bottom for the container, a base supporting the container and below the said disk and forming a continuation of said container, the center of the bottom of the base upwardly extending, a gear case depending from the upper end of said extended portion, a depending housing in the gear case, means for supporting the said housing, a shaft passing through the said housing and operatively connected with said disk, the said housing having roller bearings at its upper and lower ends, and means extending into the gear case for rotating the said shaft for the purpose specified.

2. A vegetable peeling machine comprising a container, a revolving disk acting as a bottom for the container, a base for the container below the said disk and forming a continuation of said container, and having an upwardly extending central portion, a depending gear case connected with the said central portion, the gear case carrying a depending inner housing shorter than the gear case, a shaft passing through the said housing, roller bearings in the said housing for the shaft, a horizontal gear connected with the shaft below the lower end of said housing, a horizontal housing connected with the gear housing and a horizontal shaft passing through the horizontal housing into the housing and carrying a vertical pinion in mesh with the said gear, the gear housing constructed to maintain a body of oil therein, the interior of the housing having an opening communicating with the upper shaft and its bearings, whereby the said gears and upper bearing are lubricated in the manner specified.

3. A vegetable peeling machine comprising a container, a revolving disk acting as a bottom for the container, a base for the container having its center portion extending upward, a gear housing suspended from said central base portion, a vertical shaft passing through the gear housing, means within the gear housing carrying roller bearings for the said shaft, a sleeve around the said shaft and holding said roller bearings in proper position, a housing gear attached to the end of the said shaft, and means projecting into the housing for rotating the said gear and the shaft, the parts operating as specified.

4. A vegetable peeling machine comprising a container, a revolving disk acting as a bottom for the container, a base portion for the container and forming a continuation thereof and having a central upwardly extending portion, a depending gear housing connected with said central base portion, a vertical shaft in the gear housing attached at its upper end to the said disk, means in the gear housing for receiving roller bearings for the disk shaft, a sleeve between the said roller bearings and holding them in proper position, a horizontal gear on the end of said shaft and a short sleeve between the gear and the lower roller bearing, the parts constructed for the purpose specified.

5. A vegetable peeler comprising a container, a revolving disk in the container and acting as a bottom therefor, a base supporting said container and forming a continuation thereof and an outer gear housing depending from the center of the base and an inner gear housing enclosed by the outer housing, a vertical shaft passing through the inner housing and having its upper end operatively connected with the said disk, the shaft extending downward beyond the lower end of the inner housing, said shaft having bearings in the inner housing, a horizontal gear connected with the lower extremity of the shaft and located between the lower ends of the inner and outer housing, and a horizontal drive shaft extending within the outer housing and operatively connected with the gear on the said vertical shaft.

6. A vegetable peeling machine comprising a container, a base supporting the said container and forming a continuation thereof and said base having its central portion extended upward, an outer gear housing depending from the upper end of said extension, an inner gear housing enclosed within the outer housing, the lower ends of the housings separated, a vertically extending shaft having its upper end projecting upwardly beyond the ends of both housings and operatively connected with a disk forming the bottom of the container, the said shaft journaled within the inner housing and its lower end projecting therebelow, a horizontal gear secured to the lower end of the shaft and located between the lower ends of the said housings, a horizontal shaft extending within the outer housing and carrying a vertical gear meshing with said horizontal gear, the outer housing constructed to contain oil at a depth enclosing the said horizontal gear, the inner housing having an opening located near its upper end, whereby the oil is splashed through said opening, for the purpose described.

7. A vegetable peeling machine comprising a container having a revolving disk located therein and forming a bottom therefor, a base portion receiving and supporting the said container, said base portion having a waste opening located at one side of the base, and a vertical short plug in the bottom of the base portion and passing through it, said plug located adjacent the opening and having an outlet portion extending in a direction away from the waste opening, whereby the water is made to travel in a circle and prevent the peeled material from settling and cause it to flow out of the said waste opening.

In testimony whereof I hereunto affix my signature.

CLAUDE B. McCATHRON.